United States Patent
Fink et al.

(10) Patent No.: US 11,734,444 B2
(45) Date of Patent: Aug. 22, 2023

(54) TERM-BASED ENCRYPTED RETRIEVAL PRIVACY

(71) Applicant: The Johns Hopkins University, Baltimore, MD (US)

(72) Inventors: Russell A. Fink, Laurel, MD (US); David R. Zaret, Columbia, MD (US); Paul McNamee, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 265 days.

(21) Appl. No.: 17/035,973

(22) Filed: Sep. 29, 2020

(65) Prior Publication Data

US 2022/0100884 A1    Mar. 31, 2022

(51) Int. Cl.
*G06F 21/62* (2013.01)
*G06F 16/2457* (2019.01)

(52) U.S. Cl.
CPC .... *G06F 21/6227* (2013.01); *G06F 16/24575* (2019.01); *G06F 2221/2107* (2013.01)

(58) Field of Classification Search
CPC ........... G06F 21/6227; G06F 16/24575; G06F 2221/2107; G06F 21/6254; G06F 21/62; G06F 16/2457
See application file for complete search history.

(56) References Cited

U.S. PATENT DOCUMENTS

2020/0151356 A1* 5/2020 Rohloff ............... G06F 21/6227
2021/0295822 A1* 9/2021 Tomkins .............. G06F 16/328

OTHER PUBLICATIONS

John Bethencourt et al., New Techniques for Private Stream Searching, ACM Transactions on Information and System Security, vol. 12, No. 3, Article 16 (Jan. 2009).
Rafail Ostrovsky et al., Private Searching on Streaming Data, Journal of Cryptology, 20: pp. 397-430 (2007).
Rafail Ostrovsky et al., Private Searching on Streaming Data, Crypto 2005, LNCS 3621, pp. 223-240 (2005).

* cited by examiner

*Primary Examiner* — Quazi Farooqui
(74) *Attorney, Agent, or Firm* — Sung T. Kim

(57) ABSTRACT

A term-based encrypted retrieval privacy (TERP) data retrieval system performs data retrieval from a data repository server. The system includes a client processor included with a data requesting client and a server processor included with the data repository server. The client processor determines a vector forest that is shared with the data repository server, which includes forest vectors assigned with a respective vector ID, and generates a query including an encrypted ciphertext table that cross-references the vector IDs with a corresponding ciphertext entry. The server processor receives the query, and selects a given document from the data repository server that has assigned thereto at least one nearest neighbor vector among the forest vectors. The server processor compares a nearest neighbor vector ID of the nearest neighbor vector to the vector IDs included in the encrypted ciphertext table, and generates an encoded search result based on the encrypted ciphertext entries. The client processor decrypts the encoded search result to obtain results of the query.

25 Claims, 5 Drawing Sheets

TERM-BASED ENCRYPTED RETRIEVAL PRIVACY

TECHNICAL FIELD

The inventive teachings described herein generally relate to information retrieval and more particularly, to information retrieval with query privacy.

BACKGROUND

The amount of information that is available via data networks such as the Internet, for example, continues to increase at an accelerating pace. Being able to access this data through searches and queries continues to be an important area for innovation, particularly in situations where privacy is a concern. As such, not only is the efficiency with which queries can retrieve data becoming increasingly important, but so too are privacy aspects associated with the data retrieval.

BRIEF DESCRIPTION

According to a non-limiting embodiment, a term-based encrypted retrieval privacy (TERP) data retrieval system includes a data repository server configured to store a plurality of documents. The data repository server comprises at least one server memory unit, and at least one server processor configured to execute instructions stored in the server memory unit. The server processor is configured to perform operations comprising generating a document vector indicative of at least one term contained within the document, determining a vector forest including a plurality of forest vectors, each forest vector having assigned thereto a vector identifier (ID). The operations performed by the server processor further comprise determining vector distances between the document vector and the plurality of forest vectors, and identifying at least one nearest neighbor forest vector associated with the document vector based on the vector distances. The operations performed by the server processor further comprise receiving, from a data requesting client, a query including an encrypted ciphertext table that cross-references the vector IDs with a corresponding ciphertext entry ($C_X$), and selecting a given document from the data repository server. The given document has assigned thereto at least one nearest neighbor vector included in the plurality of forest vectors, and the at least one nearest neighbor vector has assigned thereto a nearest neighbor vector ID. The operations performed by the server processor further comprise comparing the nearest neighbor vector ID of the at least one nearest neighbor vector to the plurality of vector IDs included in the encrypted ciphertext table and generating an encoded search result based, at least in part, on the encrypted ciphertext entries ($C_X$), and outputting, by the server processor, the encoded search result to the data requesting client.

According to yet another non-limiting embodiment, a term-based encrypted retrieval privacy (TERP) data retrieval system includes at least one client memory unit, and at least one client processor configured to execute instructions stored in the client memory unit. The client processor is configured to perform operations comprising generating a query vector indicative of at least one search term of a query, and determining a vector forest that includes a plurality of forest vectors. Each forest vector has assigned thereto a vector identifier (ID). The operations performed by the client processor further comprise determining vector distances between the query vector and the plurality of forest vectors, and identifying at least one nearest neighbor forest vector associated with the query vector based on the vector distances. The operations performed by the client processor further comprise generating an encrypted ciphertext table that includes the vector ID. The vector IDs are cross-referenced with a respective ciphertext entry ($C_X$) having a first value indicating that a given forest vector is the at least one nearest neighbor forest vector or a second value indicating that the given forest vector is not the at least one nearest neighbor forest vector. The operations performed by the client processor further comprise sending the encrypted ciphertext table to a data repository server to perform a query search.

According to still another non-limiting embodiment, a term-based encrypted retrieval privacy (TERP) system is configured to perform data retrieval from a data repository server configured to store a plurality of documents. The system comprises a client processor included with a data requesting client and a server processor included with the data repository server. The client processor is configured to determine a vector forest that is shared with the data repository server. The vector forest includes a plurality of forest vectors, each forest vector having assigned thereto a vector identifier (ID). The client processor is further configured to generate a query including an encrypted ciphertext table that cross-references the vector IDs with a corresponding ciphertext entry ($C_X$). The server processor is configured to receive the query, and select a given document from the data repository server. The given document has assigned thereto at least one nearest neighbor vector from among the plurality of forest vectors. The at least one nearest neighbor vector has assigned thereto a nearest neighbor vector ID. The server processor is further configured to compare the nearest neighbor vector ID of the at least one nearest neighbor vector to the plurality of vector IDs included in the encrypted ciphertext table, generate an encoded search result based, at least in part, on the encrypted ciphertext entries ($C_X$), and outputs the encoded search result to the data requesting client. The client processor decrypts the encoded search result to obtain results of the query.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
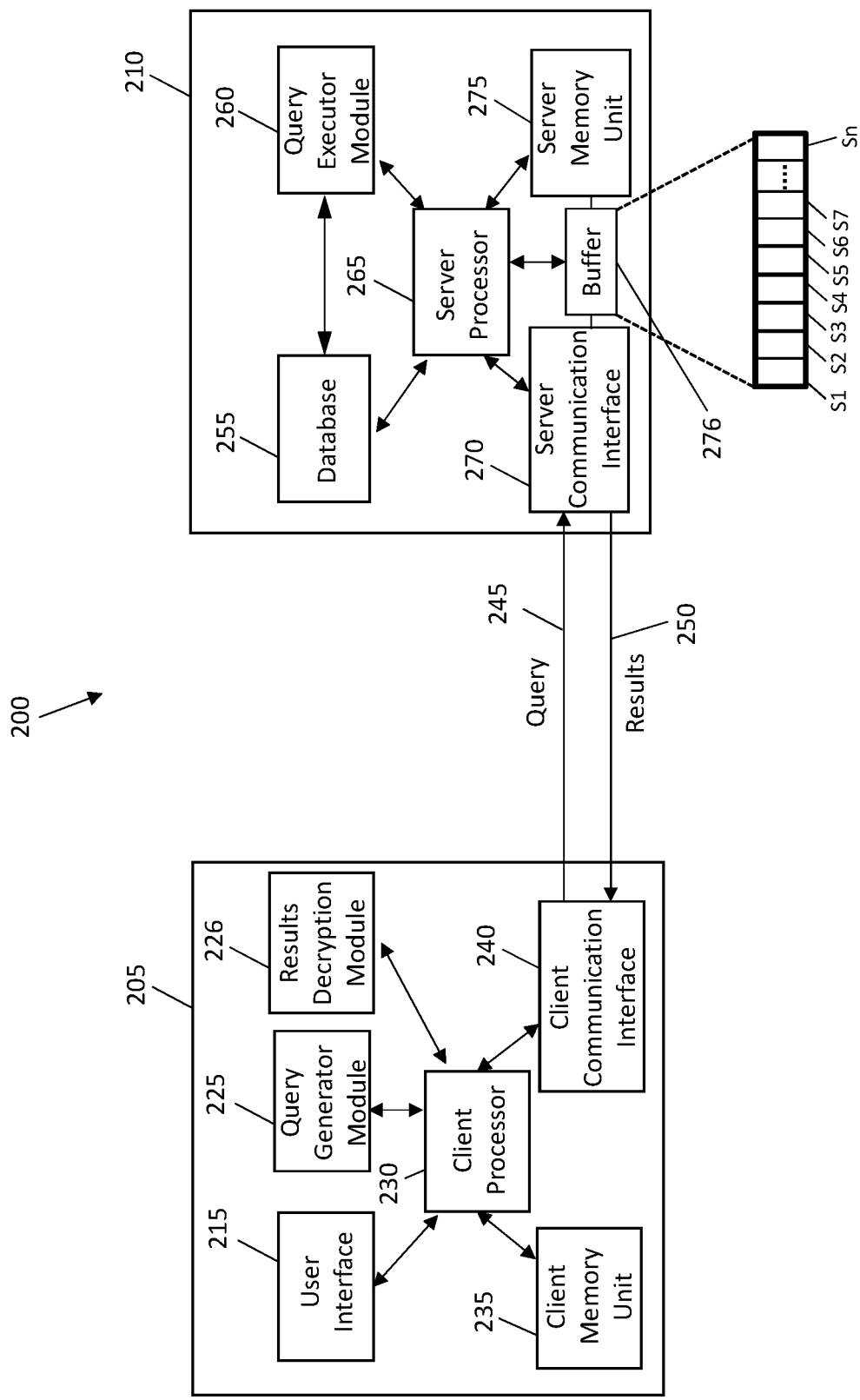
FIG. 1 is a block diagram illustrating a data requesting client in signal communication with a data repository server to perform a TERP query search according to a non-limiting embodiment.

Various non-limiting embodiments will now be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements Like reference numerals refer to like elements throughout.

The increase in on-demand storage data and retrieval services has resulted in an increased need to allow the data requestor (e.g., a client) to privately search for and retrieve data from data repositories (e.g., a data server, cloud storage network, etc.). The term "private" as used herein is used in association with data or a technique that is not known to an entity, even if that entity is managing the data repository or has access to the data stored in the data repository. In many circumstances, the content of query requests themselves may include sensitive information that should not be disclosed or known to an untrusted entity or entity other than the data requestor. In this regard, the query terms may be used and stored by the entity (e.g., data server) executing the query for purposes not known to, desired by, or authorized by the entity requesting the results. For example, an untrusted data server may analyze query terms for tracking purposes, discovering proprietary information, revealing proxy identities, or the like.

To address the privacy concerns associated with the increased demand of data retrieval, private information retrieval (PIR) protocols have been developed to facilitate a client user's ability to retrieve data (e.g., unencrypted documents) from a server storing a repository of data while revealing neither the query details nor any items that are matched and returned. Several of these PR protocols use mathematical computations to achieve confidentiality, and use special cryptographic algorithms that have homomorphic properties—referred to generally as "homomorphic encryption." A cryptosystem that is homomorphic allows mathematical manipulation of ciphertexts, generating an encrypted result which, when decrypted, reflects the result of the manipulation as if comparable operations had been performed on the plaintexts. Such computationally private information retrieval (CPIR) systems, and PIR systems in general, protect query terms from disclosure by preventing any unauthorized entity from determining the topic of the documents or the documents themselves that were searched within the server and returned to the client.

According to various non-limiting embodiments, methods and systems are described herein to improve the privacy and efficiency of information retrieval from a repository or data server. In one or more examples, the inventive teachings described herein provide a term-based encrypted retrieval privacy (TERP) system, which permits a data requestor to transmit a query to a data repository. The TERP system described herein is based on methods that are variously called full-text searching, concept searching, or compound-term searching, which perform the query at the data repository, and receive query results while maintaining the privacy of not only the retrieved results but also the terms of the submitted query. In this manner, an improved TERP system is provided.

Turning now to FIG. 1, a TERP data retrieval system 200 is shown in greater detail according to a non-limiting embodiment. The TERP data retrieval system 200 includes a data requesting client 205 in signal communication with a data repository server 210 to perform a TERP query search according to various non-limiting embodiments described herein. The data requesting client 205 can include a client computer workstation, a personal computing device, or other device operable by a user and configured to generate one or more queries 245. The data repository server 210 can include, for example, a data repository computer system, one or more data computing servers, and/or a cloud-computing server network, and is configured to store retrievable data such as, for example, unencrypted documents to be retrieved according to one or more queries 245 provided by the data requesting client 205.

The data requesting client 205 includes a client processor 230 in signal communication with a user interface 215, a query generator module 225, a results decryption module 226, a client memory unit 235, and a client communication interface 240. Any one of the client processor 230, the query generator module 225, and the results decryption module 226 can be constructed as an electronic hardware controller that includes memory and a processor configured to execute algorithms and computer-readable program instructions stored in the memory. In one or more embodiments, the query generator module 225 and the results decryption module 226 may include or otherwise be in signal communication with client processor 230 that is configurable to perform actions in accordance with example embodiments described herein including the actions described with respect to the data requesting client 205. In other non-limiting embodiments, the client processor 230, the query generator module 225, and the results decryption module 226 can all be embedded or integrated in a single controller.

The client processor 230 includes processing circuitry configured to perform data processing, control function execution or other processing and management services according to an example embodiment. In some embodiments, the client processor 230 may be embodied as a chip, chip set, ASIC, or FPGA. In other words, the client processor 230 may comprise one or more physical packages (e.g., chips) including materials, components or wires on a structural assembly (e.g., a baseboard). The client processor 230 may be configured to receive inputs (e.g., via peripheral components including the client memory unit 235, perform actions based on the inputs, and generate outputs (e.g., for provision to peripheral components).

In an example embodiment, the client processor 230 can be constructed using one or more instances of a processor, associated circuitry, and client memory unit 235. The processing circuitry may be in communication with, or otherwise control, user interface 215 and client communication interface 240. As such, the client processor 230 may be embodied as a circuit chip (e.g., an integrated circuit chip) configured (e.g., with hardware, software or a combination of hardware and software) to perform operations described herein.

The client communication interface 240 may include one or more interface mechanisms for enabling communication with other devices, such as the data repository server 210 to send the query 245 and receive results 250 satisfying the query 245. In some cases, the client communication interface 240 may be any means such as a device or circuitry embodied in either hardware, or a combination of hardware and software that is configured to receive or transmit data from/to devices in communication with the client processor 230.

The user interface 215 may include one or more interface mechanisms (e.g., keyboard, touch screen, mouse, monitor, or the like) for enabling users to input and interface with data (e.g., a search pattern) to be operated upon by the client processor 230. In some cases, the user interface 215 may be any means such as a device or circuitry embodied in either hardware, or a combination of hardware and software that is configured to receive and provide data to the client processor 230 to perform various functionalities as provided herein.

Further, in some cases, the user interface 215 may be any means such as a device or circuitry embodied in either hardware, or a combination of hardware and software that is configured to output data to a user as provided by the client processor 230 to perform various functionalities as provided herein.

In an exemplary embodiment, the client memory unit 235 may include one or more non-transitory memory devices such as, for example, volatile or non-volatile memory that may be either fixed or removable. The client memory unit 235 may be configured to store information, data, applications, instructions or the like for enabling the query generator module 225 and the results decryption module 226 to carry out various functions in accordance with exemplary embodiments of the present invention. For example, the client memory unit 235 could be configured to buffer input data for processing by the client processor 230, the query generator module 225, and/or the results decryption module 226. Additionally or alternatively, the client memory unit 235 could be configured to store instructions for execution by the client processor 230, the query generator module 225, and/or the results decryption module 226. Among the contents of the client memory unit 235, applications may be stored for execution by the client processor 230 in order to carry out the functionality associated with each respective application. In some cases, the applications may include directions associated with the query generator module 225 and the results decryption module 226.

The client processor 230 may be embodied in a number of different ways. For example, the client processor 230 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the client processor 230 may be configured to execute instructions stored in the client memory unit 235 or otherwise accessible to the client processor 230. As such, whether configured by hardware or by a combination of hardware and software, the client processor 230 may represent an entity (e.g., physically embodied in circuitry in the form of client processor 230) capable of performing operations according to embodiments of the present invention while configured accordingly. Thus, for example, when the client processor 230 is embodied as an ASIC, FPGA or the like, the client processor 230 may be specifically configured hardware for conducting the operations described herein. Alternatively, as another example, when the client processor 230 is embodied as an executor of software instructions, the instructions may specifically configure the client processor 230 to perform the operations described herein.

In some non-limiting embodiments, the client processor 230 may be embodied as, include or otherwise control the query generator module 225 and the results decryption module 226. Accordingly, the client processor 230 may be said to cause each of the operations described in connection with the query generator module 225 and the results decryption module 226 to undertake the corresponding functionalities responsive to execution of instructions or algorithms configuring the client processor 230 accordingly. For example, the client processor 230 may provide programmable control signals, selections, and the like to control the operation of the data requesting client 205 in accordance with the query generator module 225 and the results decryption module 226 responsive to execution of instructions stored in the client memory unit 235.

As mentioned above, the query generator module 225 may be embodied in the hardware of the client processor 230 or embodied in hardware of the processing circuitry as configured by instructions stored in the client memory unit 235. The query generator module 225 may be configured to receive a search pattern, e.g., one or more plain text search terms from a data requesting entity (e.g., a user) operating the user interface 215. In one or more embodiments of the invention, the query generator module 225 is configured to transmit an encrypted query to the data repository server 210 while maintaining the privacy of the terms of the submitted query. Accordingly, the user can search for and retrieve data at the data repository server 210 in a manner that maintains privacy of the search pattern from the data repository server 210 while permitting the data repository server 210 to return results corresponding to the encrypted query 245. The process generating the encrypted query 245 is described in greater detail below.

The results decryption module 226 may be embodied in hardware of the client processor 230 or embodied in the hardware of the processing circuitry as configured by instructions stored in the client memory unit 235. In this regard, the results decryption module 226 may be configured to decrypt query results received from the data repository server 210. The decrypting may be performed to retrieve any target data (e.g., metadata, text of a document, etc.) of a target query record (e.g., document) that has been included in a private encoding of the query results received from the data repository server 210.

The data repository server 210 includes a server processor 265 in operable communication with a database 255, a query executor module 260, a server memory unit 275, and a server communication interface 270. The server processor 265 and/or the query executor module 260 can be constructed as an electronic hardware controller that includes memory and a processor configured to execute algorithms and computer-readable program instructions stored in the memory. The query executor module 260 may include or otherwise be in communication with server processor 265 that is configurable to perform actions in accordance with example embodiments described herein. In other non-limiting embodiments, the server processor 265 and/or the query executor module 260 can all be embedded or integrated in a single controller.

The server processor 265 includes processing circuitry configured to perform data processing, control function execution or other processing and management services according to an example embodiment. In some embodiments, the server processor 265 may be embodied as a chip, chip set, ASIC, or FPGA. In other words, the server processor 265 may comprise one or more physical packages (e.g., chips) including materials, components or wires on a structural assembly (e.g., a baseboard). The server processor 265 may be configured to receive inputs (e.g., via peripheral components including the server memory unit 275, perform actions based on the inputs, and generate outputs (e.g., for provision to peripheral components).

In an example embodiment, the server processor 265 may include one or more instances of a processor, associated circuitry, and server memory unit 275. The processing circuitry may be in communication with or otherwise control database 255 and server communication interface 270. As such, the server processor 265 may be embodied as a circuit chip (e.g., an integrated circuit chip) configured (e.g., with hardware, software or a combination of hardware and software) to perform operations described herein.

The server communication interface 270 may include one or more interface mechanisms for enabling communication with other devices, such as the data requesting client 205 to receive the query 245 and send the results 250. In some cases, the server communication interface 270 may be any means such as a device or circuitry embodied in either hardware, or a combination of hardware and software that is configured to receive or transmit data from/to devices in communication with the server processor 265.

The database 255 may be a collection of data records (e.g., unencrypted documents) stored on a tangible memory device and accessible for reading or writing by the server processor 265. The data records may also include metadata associated with the documents. According to some example embodiments, the database 255 may be remote from the server processor 265 and may be accessible to the server processor 265 via the server communication interface 270. Via the server processor 265, the query executor module 260 may be configured to query the records in the database 255. As one example, a web search might include documents divided into metadata. The metadata may include the URL (uniform resource locator) identifier of a document, and the "content" or words in the document. Accordingly, any query submitted by the data requesting client 205 may aim to retrieve the metadata identifying a matching document stored in the database 255.

In an exemplary embodiment, the server memory unit 275 may include one or more non-transitory memory devices such as, for example, volatile or non-volatile memory that may be either fixed or removable. The server memory unit 275 may be configured to store information, data, applications, instructions or the like for enabling the query executor module 260 to carry out various functions in accordance with exemplary embodiments of the present invention. For example, the server memory unit 275 could be configured to buffer input data for processing by the server processor 265. Additionally or alternatively, the server memory unit 275 could be configured to store instructions for execution by the server processor 265. Additionally or alternatively, some or all of the server memory unit 275 may be allocated to be a buffer. Among the contents of the server memory unit 275, applications may be stored for execution by the server processor 265 in order to carry out the functionality associated with each respective application. In some cases, the applications may include directions associated with the query executor module 260.

The server processor 265 may be embodied in a number of different ways. For example, the server processor 265 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the server processor 265 may be configured to execute instructions stored in the server memory unit 275 or otherwise accessible to the server processor 265. As such, whether configured by hardware or by a combination of hardware and software, the server processor 265 may represent an entity (e.g., physically embodied in circuitry in the form of server processor 265) capable of performing operations according to embodiments of the present invention while configured accordingly. Thus, for example, when the server processor 265 is embodied as an ASIC, FPGA or the like, the server processor 265 may be specifically configured hardware for conducting the operations described herein. Alternatively, as another example, when the server processor 265 is embodied as an executor of software instructions, the instructions may specifically configure the server processor 265 to perform the operations described herein.

In an example embodiment, the server processor 265 may be embodied as, include or otherwise control the query executor module 260. As such, in some embodiments, the server processor 265 may be said to cause each of the operations described in connection with the query executor module 260 to undertake the corresponding functionalities responsive to execution of instructions or algorithms configuring the server processor 265 accordingly. For example, the server processor 265 may provide programmable control signals, selections, and the like to control the operation of the data repository server 210 in accordance with the query executor module 260 responsive to execution of instructions stored in the server memory unit 275.

The query executor module 260 may be embodied in the hardware of the server processor 265 or embodied in hardware of the processing circuitry as configured by instructions stored in the server memory unit 275. The query executor module 260 may be configured to perform a private query search, based on the content of the query 245, against one or more target query records (e.g., documents) stored by the data repository server 210. Accordingly, a query search can be performed that maintains the privacy of the terms included in the query 245 and the query results 250 returned to the data requesting client 205. The process executing the private query search is described in greater detail below.

According to a non-limiting embodiment of the invention, the TERP data retrieval system 200 includes an initialization process, a document ingestion process, a query creation process, a query execution process, and a query decoding process. It should be appreciated that one or more of the processes are not required to be performed sequentially in the order described below, and instead one or more of the processes may be performed independently and/or in parallel from one another.

The initialization process involves communication between the data repository server 210 and the data requesting client 205 to agree on a large dimensional vector space (V). A vector space includes a plurality of individual vectors, where a single vector is a collection of a set number of individual values and where that number of values is the dimension of the vector space. For example, the point <10,12,15> is a vector in a 3-dimensional vector space, and each number represents a value along each of its coordinates X, Y, and Z. For the purposes of this description, each dimension of a vector or vector space may be referred to as a "vector slot" (e.g., 200 slots implies 200 dimensions) that can be filled with a real-valued data point. The value of the real-valued data point can range, for example, between 0.00 to 1.00, e.g., V=<0.0, 0.1, 0.0, 0.0, 0.9, . . . >. In this regard, the odds of any two vectors, obtained by calculating the measurements of two different quantities, having exactly the same value in the same dimensions are very small. The range 0.00 to 1.00 is used herein as an example and it should be appreciated that other vectors slots can be set to other ranges without departing from the scope of the invention.

The data requesting client 205 and the data repository server 210 determine one or more "vector forests" (also referred to as a "corpus of vectors"). The vector forest is public and can be generated by the data requesting client 205, the data repository server 210, and/or a third party. In one or more embodiments, several different vector forests may be generated, and each vector forest can be assigned a unique forest identifier. In either case, the identity of the vector forest can be utilized by the data requesting client 205 to inform the data repository server 210 from which vector forest the query was derived.

The vector forest includes a plurality of vectors (referred to herein as "forest vectors"), which are shared between the data requesting client 205 and the data repository server 210. Each forest vector is given a unique identifier: N1, N2, N3 . . . NN. Vectors in the forest may be chosen at random, i.e., each dimension or slot may independently be assigned a real number at random, or the vectors may be chosen deterministically according to some algorithm. It should be appreciated that the method of generating the vector forest described herein is only one example and does not limit the scope of the invention.

The document ingestion process is performed by the data repository server 210. The document ingestion process can include various cleaning, term extraction and numeric manipulation techniques. It should be appreciated that the specific techniques described herein do not represent an exhaustive list and do not limit the scope of the invention. For each document stored in the database 255, the data repository server 210 (e.g., the server processor 265) splits the document into distinct terms. The data repository server 210 then corrects spelling errors, along with discarding stopwords, and punctuations to retain word stems. The retained word stems are sometimes referred to as "clean terms." It should be appreciated that the techniques for generating clean terms described herein do not represent an exhaustive list and do not limit the scope of the invention.

The data repository server 210 then proceeds to determine a weighted value for each of the clean terms. The weighted value can establish a distinguishable significance or property among the words or terms included in a given document. In one or more non-limiting embodiments, a term frequency-inverse document frequency (TF-IDF) analysis is performed on each clean term associated with the document. TF-IDF analysis is a numerical statistic that aims to reflect how important a given term is relative to all other remaining terms included in a collection or corpus, e.g., a given document. The numerical statistic can include a real-valued data point value having a range that matches the range of the vector slots (e.g., 0.00 to 1.00) used to define the individual vectors of the vector space employed by the TERP data retrieval system 200. Accordingly, terms having a value closer to 1.00 can be deemed more important, significant, and/or or less frequently used (i.e., unique) than terms having a value closer to 0.00.

A single document could have hundreds or even thousands of words, and therefore hundreds or thousands of associated weighted values. Accordingly, the TERP data retrieval system 200 can set a number of TOPWORDS associated with every document stored in the data repository server 210. In some embodiments, the set number of TOP-WORDS is agreed upon by both the data requesting client 205 and the data repository server 210. In other embodiments, the data requesting client 205 can limit the number of TOPWORDS included in the client query to be no greater than the number of TOPWORDS set by the TERP data retrieval system 200. Accordingly, the data repository server 210 will consider the number of TOPWORDS from among all the words or terms included in a given document when performing a query search analysis. For example, if the number of desired TOPWORDS is twenty TOPWORDS, the data repository server 210 ranks the list of terms by TF-IDF value and chooses the top twenty of them. The words or terms corresponding to the top twenty highest TF-IDF values are deemed the TOPWORDS of the document. The selection of twenty top terms is just one example, and other numbers of top highest TF-IDF values can be utilized without departing from the scope of the invention.

After generating the weighted values of the words associated with a given document, the data repository server 210 can generate a corresponding document vector. The document vector can be defined according to the dimensions of the individual vectors employed in the vector space as described in detail above. That is, each document vector includes a plurality of vector slots (e.g., 200 slots), which defines the dimension (D) of the document vector. Each of these vector slots are initially empty or set to a "zero value." One or more of the vector slots are then subsequently filled with the weighted values of the TOPWORDS as described in greater detail below.

In one or more embodiments of the invention, the data repository server 210 populates the document vector in a particular way that maps weighted TOPWORD values to specific vector slots. The data repository server 210 may use a hash function to determine a slot to apply weighted values for a particular TOPWORD. A hash function accepts, as input, a sequence of characters of a cleaned term and an index number, i.e., an integer number defining an index space (1 to D), and produces, as an output, an integer that lies within the index space. The data repository server 210 can therefore apply a hash function with an input of the specific term corresponding to each TOPWORD (e.g., each weighted TOPWORD) included in a given document, and the index space equal to the number of vector slots (i.e., dimensions) of the vector space, to obtain a slot identifier. For example, a call to the function of hash("novelty", 200) might return the value 198; in this case, any call to hash ("novelty", 200) will always return the value 198. This technique is performed in a way that unique words can be mapped to different vector slots, probabilistically. Accordingly, each vector slot indexed by a respective hash is filled with a non-zero value corresponding to the weighted TOP-WORD value. Vector slots that are not associated with a hash maintain the initial zero value.

The hash function aims to generate an index number that has a low probability of "colliding" with other terms. However, it may be that the hash function assigns two or more elements to the same index by chance. This scenario is referred to as a "collision." When a collision occurs, the data repository server 210 can perform various collision resolution techniques such as, for example, adding the numeric values, to resolve the collision. The collision resolution techniques, however, do not limit the scope of the invention.

In one or more embodiments of the invention, the data repository server 210 compares the document vector to the forest vectors in a given vector forest. The forest vector that is nearest in distance to the document vector is identified as the nearest neighbor vector of the document vector. In one or more non-limiting embodiments, a single closest nearest neighbor vector is assigned to the document. In other non-limiting embodiments, a plurality of nearest neighbor vectors can be assigned to the document. In one or more embodiments, the data repository server 210 determines which vector is "nearest" by calculating the distance between the document vector and each individual forest vector using the cosine similarity formula:

$$\cos\theta = \frac{A \cdot B}{\|A\| \|B\|}. \qquad \text{Eq. 1}$$

The cosine similarity formula computes the dot product of the document vector and individual forest vector, and divides it by the product of their magnitudes which returns a degree of similarity between −1 and 1. The closest nearest neighbor vector is that which has the highest absolute value dot product (i.e., lowest angle, or distance, between the vectors) when computed with the document vector.

The data repository server 210 creates a list of vector IDs of the forest vectors, organized by nearest vector first (i.e., lowest distance value), to farthest vector last (i.e., highest distance value). In one non-limiting embodiment, the vector with the lowest distance value can be selected as the closest nearest neighbor vector to the document. This closest nearest neighbor vector can then be used to identify a match between the corresponding document and a query. In other non-limiting embodiments, several vectors from the list can be selected as being nearest neighbor vectors to a given document, and an analysis can be performed to determine if any of the selected nearest neighbor vectors matches the query. Although the description going forward describes the vector matching technique using a single closest nearest neighbor to a given document, it should be appreciated that multiple nearest neighbor vectors can be assigned to a document to perform the vector matching techniques described herein without departing from the scope of the invention.

For example, in either case described above, data repository server 210 can choose from the list one or more vectors indicative as being a nearest neighbor vector with respect to a given document. The one or more nearest neighbor vectors can be determined at the time the document vector is generated or can be determined for each document after all document vectors are initially generated. Accordingly, the data repository server 210 can select a given document vector, determine one or more of its nearest neighbor vectors, and move onto the next document in the collection until all document vectors are assigned at least one nearest neighbor vector. In either case, the data repository server 210 can store a look up table (LUT) in memory, which cross-references each document with one or more of its nearest neighbor vectors. As described above, each forest vector is assigned a unique vector identifier (ID): N1, N2, N3 . . . NN. Accordingly, the data repository server 210 can cross-reference a selected document to the vector ID listed in the LUT to determine its corresponding nearest neighbor vector(s).

The query creation process is performed by the data requesting client 205 and begins with the data requesting client 205 receiving a full text query that includes a set of plaintext terms or words. It should be appreciated that the specific techniques described herein do not represent an exhaustive list and do not limit the scope of the invention. The data requesting client 205 splits the full text query into distinct terms, and performs text filtering on the distinct terms in preparation to undergo a TF-IDF analysis. The text filtering includes correcting spelling errors along with discarding stopwords and punctuations to retain word stems, i.e., the clean words. It should be appreciated that the techniques for generating clean terms described herein do not represent an exhaustive list and do not limit the scope of the invention.

Similar to the document creation process described above, the data requesting client 205 proceeds to determine a weighted value for each of the clean terms. The weighted value can establish a distinguishable significance or property among the words or terms included in the input search query. In one or more non-limiting embodiments, the data requesting client 205 performs a TF-IDF analysis to determine how important each term is relative to all other remaining terms included in the input search query. Similar to when generating the document vector, the weighted values associated with the terms of the input search query can include a real-valued data point value having a range that matches the range of the vector slots (e.g. 0.00 to 1.00) used to define the individual vectors of the vector space employed by the TERP data retrieval system 200. Accordingly, query terms having a value closer to 1.00 can be deemed more important, significant, and/or or less frequently used (i.e., unique) than query terms having a value closer to 0.00. In addition, the data requesting client 205 can determine TOPWORDS among the query terms by rank ordering the values in a similar manner as described regarding the TOPWORDS of the document vector. For sake of brevity, the process of generating TOPWORDS will not be repeated.

After generating the weighted values of the query terms, the data requesting client 205 generates a corresponding query vector. The query vector can be defined according to the dimensions of the individual vectors employed in the vector space as described in detail above. That is, each query vector includes a plurality of query vector slots (e.g., 200 slots), which defines the dimension (D) of the query vector. Each of these query vector slots are initially empty or set to a "zero value." One or more of the query vector slots are then subsequently filled with the weighted values of the TOPWORDS associated with the input query (e.g., the query terms) as described in greater detail below.

In one or more embodiments of the invention, the data requesting client 205 applies a hash function to each TOPWORD (e.g., each weighted TOPWORD) associated with the input query. Similar to generating the document vector described above, each resulting hash represents an index value that points to a corresponding query vector slot of the query vector. Accordingly, each query vector slot indexed by a respective hash is filled with a non-zero value corresponding to the weighted TOPWORD value. Query vector slots that are not associated with a hash maintain the initial zero value. In addition, any collision events can be resolved using resolution techniques similar to those performed by the data repository server 210 described above.

In one or more embodiments of the invention, the data requesting client 205 compares the query vector to each of the forest vectors included in the vector forest and ranks the individual forest vectors in order of increasing distance from the query vector. In one or more embodiments, the data requesting client 205 calculates the distance between the query vector and an individual forest vector using the aforementioned cosine similarity formula. Accordingly, the data requesting client 205 can rank the forest vectors in order of increasing cosine similarity distance from the query vector and can generate a list that includes the vector IDs of one or more of the top nearest neighbor forest vectors, i.e., the forest vectors closest to the query vector. In one or more non-limiting embodiments, the number of nearest neighbor forest vectors can be determined as a selected number (N) of closest nearest neighbor forest vectors having the lowest vector distance values. For example, twenty of nearest neighbor forest vectors having the lowest cosine similarity distance can be determined as the closest nearest neighbor forest vectors of the query vector.

The query vector may be associated with several nearest neighbor forest vectors. In one or more embodiments, the user operating the user interface 215 can set the number of nearest neighbor forest vectors to consider as a match to the query vector, which in turn controls the precision of the query. A larger number of forest vectors in the query vector list allows for matching a greater number of documents from the server 210 at the expense that some documents may be less relevant to the input query. A lower number of forest vectors in the query vector list allows for matching a lower number, and hence a more precise matching, of documents at the expense of possibly excluding documents that may be relevant to the query.

In one or more non-limiting embodiments of the invention, the data requesting client 205 generates a query nearest neighbor ciphertext table. The ciphertext table allows the data requesting client 205 to submit a query indicative of one or more search terms without allowing the data repository server 210 to learn or identify the specific terms or words of the query. More specifically, the query nearest neighbor ciphertext table lists the vector IDs of the forest vectors and cross-references each vector ID to a respective ciphertext entry ($C_X$). The ciphertext entry ($C_X$) indicates whether or not the corresponding forest vector ID corresponds to one of the nearest neighbor forest vectors associated with the query vector. For example, the data requesting client 205 can assign an encrypted first value (e.g., an integer "1") to ciphertext entries indexed by one of the top nearest neighbor forest vectors, while assigning an encrypted second value (e.g., an integer "0") to the remaining ciphertext entries (thus indicating that they are not among the top nearest neighbor forest vectors). These ciphertext entries, however, are encrypted, and their plaintext values are known only to the data requesting client 205; not to the data repository server 210.

More specifically, the data requesting client 205 generates a private/public encryption keypair according to a homomorphic encryption method such as the Paillier cryptographic algorithm, for example, to generate encrypted ciphertext entries (e.g., the integer "1" values and the integer "0" values). The Paillier cryptographic algorithm also generates a public modulus along with the public key. It should be appreciated that the Paillier cryptographic algorithm described herein is just one example, and other homomorphic encryption methods can be employed without departing from the scope of the invention. Thus, an encryption of an actual value (X) (sometimes referred to as plaintext) using the public key generates an encrypted ciphertext entry ($C_x$), while decrypting the ciphertext entry ($C_x$) using the private key returns the actual value (X). In addition, the encrypted ciphertext entries ($C_x$) representing each actual value (X) are randomly generated such that they are "semantically secure." That is, there can be multiple encryption values ($C_1$, $C'_1$, $C''_1$, $C'''_1$, $C^{iv}_1$, ...) that are all distinct ciphertexts but that encrypt a common plaintext value (e.g., an integer "1" or an integer "0"). For example, a first integer "1" value may be encrypted as a randomly generated hexadecimal value of 8CDE, a first integer "0" value may be encrypted as a randomly generated hexadecimal value of F3DB, a second integer "1" value may be encrypted as a randomly generated hexadecimal value 02AA, a second integer "0" value may be encrypted as a randomly generated hexadecimal value E2DB, etc. In this manner, the data repository server 210 can determine that each vector ID is cross-referenced to a respective encrypted ciphertext entry ($C_x$), but is unable to determine the plaintext value of the ciphertext (i.e., whether the ciphertext entry is an integer "1" or an integer "0"). The data repository server 210 also cannot tell whether two separate ciphertexts are encryptions of the same plaintext value, supporting a design property called indistinguishability. Although the actual value of the encrypted ciphertext is unknown to the data repository server 210, the data repository server 210 is still capable of executing the query search as described in greater detail below.

To initiate the TERP query search, the data requesting client 205 provides the data repository server 210 with an encrypted query 245 that includes, but is not limited to, the encrypted ciphertext table, the public key and modulus corresponding to the homomorphic encryption system employed by the data requesting client 205, an identifier of the specific vector forest from which the data requesting client 205 derived the query, the hash function used to map term values into slots in vectors, and a return buffer frequency (RBF) value (described below) set by the data requesting client 205. Optionally, the data requesting client 205 can also include a search space reduction function, which accepts a non-private, general characteristic criteria of the matching documents, and returns "True" for documents that meet the criteria or "False" otherwise, which reveals some information about the documents of interest but remains within the desired security policy of the client.

In a non-limiting embodiment, if the data repository server 210 has one trillion documents, for example, and the data requesting client 205 is aware that a document(s) sought contains a specific term or word, the search space reduction function would indicate to the data repository server 210 "True" for each document that contains the specific term or word, and "False" for each document that does not contain the specific term or word. Accordingly, the scope of the query search can be limited by reducing the number of possible matches to thousands of documents, for example, rather than trillions of documents. Another example embodiment would be to perform a hash on the identity of the nearest neighbor vectors within a small index space, selecting only those documents with nearest neighbor identities that are mapped to indexes referenced by the query. For example, hashing the neighbor identity over a space of 1000 slots, e.g., hash(N, 1000), and selecting those that match any specific slot would reduce the search space by a factor of 1000. Accordingly, the data repository server 210 can perform the TERP query search on the reduced search space thereby reducing the number of documents returned to the data requesting client 205 that are of minimal relevancy. In addition, collisions that occur on such a small space would ensure that a minimal amount of information is revealed about the query.

In response to receiving the encrypted query 245, the data repository server 210 maintains a buffer 276 of processed encrypted document metadata to return to the data requesting client 205. In a non-limiting embodiment, the buffer 276 includes a collection of "buffer slots" (S1, S2, S3, S4, S5, S6, S7 . . . Sn), each buffer slot sized to contain one ciphertext, encoding the metadata to return as described below, produced by the non-limiting encryption scheme. The buffer slots are indexed by an integer from the buffer 276 as a means for the data repository server 210 to access individual ones. Based on the encrypted query 245, the data repository server 210 initializes a buffer slot value (B) for every buffer slot in the buffer 276 in the server memory 275 with the encryption of an integer zero ("0") and determines a candidate document search space. The "0" integer indicates that a given buffer slot currently is unused.

The data repository server 210 performs a query analysis on each candidate document proceeding with the data repository server 210 by extracting information (including metadata (M)) from the server database 255 concerning a given document. The metadata (M) includes, but is not limited to, information such as document name, document summary, date, time, authorship; and the unique ID of the determined document nearest neighbor forest vector. As described in detail above, each document stored in the server database 255 may correspond to a single nearest neighbor vector with a unique vector ID. The data repository server 210 cross-references the vector ID of the nearest neighbor vector assigned to the current selected document with the nearest neighbor forest vector IDs listed in the ciphertext table and extracts the corresponding encrypted ciphertext entry ($C_x$).

The extracted ciphertext entry ($C_x$) is then used by the data repository server 210 to encrypt the metadata (M) corresponding to the selected document to generate an encoded search result. In one or more non-limiting embodiments, the data repository server 210 applies a homomorphic scalar multiplication encryption method to generate the encoded result. The homomorphic scalar multiplication method involves applying an integer function to combine the extracted metadata (M) with the extracted ciphertext entry ($C_x$), which can be represented as "$M \odot C_x$" producing a ciphertext per the selected encryption scheme. Although the actual encoded result is unknown to the data repository server 210, the homomorphic scalar multiplication encryption method will generate an encryption of the metadata (M) when the plaintext value of the ciphertext entry ($C_x$) is an integer "1" (i.e., $M \odot C_1 = C'_M$), but will generate an encryption of integer "0" (i.e., excludes the metadata (M)) when the plaintext value of the ciphertext entry ($C_x$) is integer "0" (i.e., $M \odot C_0 = C'_0$). In one or more non-limiting embodiments, a Paillier encryption method is utilized. Under the Paillier additive system, the integer function "$x \odot y$" becomes the power modulus function, "$x^y$" modulus the public Paillier value. However, it should be appreciated that other encryption methods may be employed, perhaps using different integer functions (e.g., multiplication for some fully homomorphic systems) without departing from the scope of the invention. It should be appreciated that the mention of specific homomorphic encryption systems and operations for encoding the query results do not represent an exhaustive list and do not limit the scope of the invention.

Following the encoding step, in one or more non-limiting embodiments, results are updated into the buffer 276 as follows. The data repository server 210 selects a buffer slot at random from the buffer 276. In a non-limiting embodiment, the buffer slots are indexed by integers, whereby the data repository server 210 selects a random integer corresponding to one of the integers in the buffer index, and selects the buffer slot corresponding to the index that matches the randomly selected integer. In one or more non-limiting embodiments, buffer slots may be chosen in other ways, such as by hash value of the one or more document nearest neighbor vectors, one at a time in a round-robin fashion, or per some other mathematical function. The contents of the selected buffer slot are updated by first assigning a temporary buffer value (B) to contain the current value of the buffer slot. After generating the encoded results ($M \odot C_x$), the data repository server 210 creates a new buffer value (B') by applying the encoded result ($M \odot C_x$) to the current buffer value (B) of the buffer 276, using an integer mathematical function $\oplus$. Accordingly, the data repository server 210 sets the new buffer value (B'), as:

$$B' := B \oplus D(M \odot C_x). \qquad \text{Eq. 2}$$

In one or more non-limiting embodiments, a Paillier encryption method is utilized. which includes the Paillier encryption method. Under the Paillier additive system, the integer function "$x \oplus y$" becomes the multiplication modulus function, "xy" modulus the public Paillier value. However, it should be appreciated that other encryption methods may be employed, perhaps using different integer functions (e.g., addition for some fully homomorphic systems) without departing from the scope of the invention. It should be appreciated that the mention of specific homomorphic encryption systems and operations for updating the buffer 276 do not represent an exhaustive list and do not limit the scope of the invention.

The data repository server 210 then assigns the value B' to the selected buffer slot in the buffer array. As mentioned above, the data repository server 210 can control the amount of data stored in the results buffer array based on the RBF value set by the data requesting client 205. In one or more non-limiting embodiments, the data repository server 210 updates a running count of candidate documents processed thus far. When the count (e.g., the results contained in the buffer 276) exceeds the RBF value, the data repository server 210 returns the results 250 contained in the buffer 276 to the data requesting client 205, resets each buffer slot in the array to the initial (zero) state, and resets the running count of documents. Following completion, the data repository server 210 returns the new results 250 from the buffer 276 to the data requesting client 205 as it contains the last of the candidate documents.

More specifically, in one or more embodiments, the data repository server 210 performs a counting operation to determine how often the results should be returned to 205. Since the data repository server 210 does not know when a document matches a query submitted by the data requesting client 205, the data repository server 210 records the number of documents processed during the query search into a counter stored in server memory unit 275. In order to prevent a scenario where two hits (e.g., matches) occur, wherein the second match would be updated to a buffer slot containing a prior match which would corrupt both the previous and updated encoded data in the buffer slot (referred to as a collision), the data repository server 210 periodically sends intermediate results 250 back to the data requesting client 205, refreshes the buffer 276, resets the counter, and continues processing the query. The return periodicity is governed by the RBF value. In one or more non-limiting embodiments, the RBF rate can be decreased by the requesting client 205 to reduce the probability of a collision occurring in the buffer 276, at the expense of increased bandwidth consumption and more frequent communications.

Upon receiving the encrypted results array 250 from the data repository server 210, the data requesting client 205 applies the private key to obtain the unencrypted results from each buffer slot in the buffer 276. The unencrypted results from each buffer slot include data indicating that no candidate documents satisfied the query submitted by the data requesting client 205, second data (e.g., metadata) indicating a single document was identified that satisfied the submitted query and encoded into that buffer slot, or third data (e.g., a integer) indicating a collision event when two or more documents satisfied the submitted query and were both updated into the same buffer slot. In one or more embodiments, the data requesting client 205 can further decode the unencrypted metadata to obtain portions of actual text corresponding to the matching document.

Figure 2A:
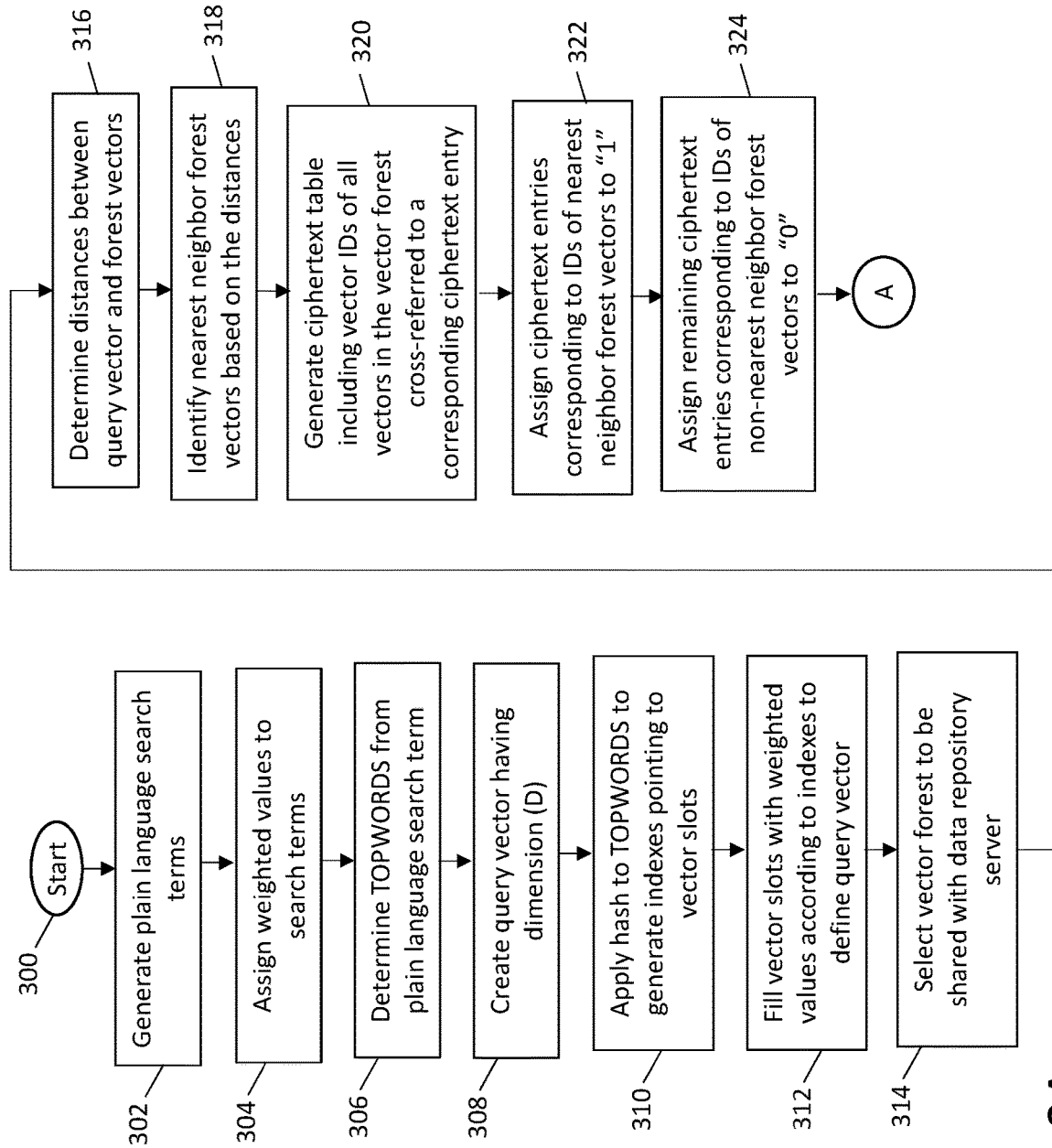
FIGS. 2A and 2B depict a flow diagram illustrating a query creation process performed by the data requesting client according to a non-limiting embodiment.
Figure 2B:
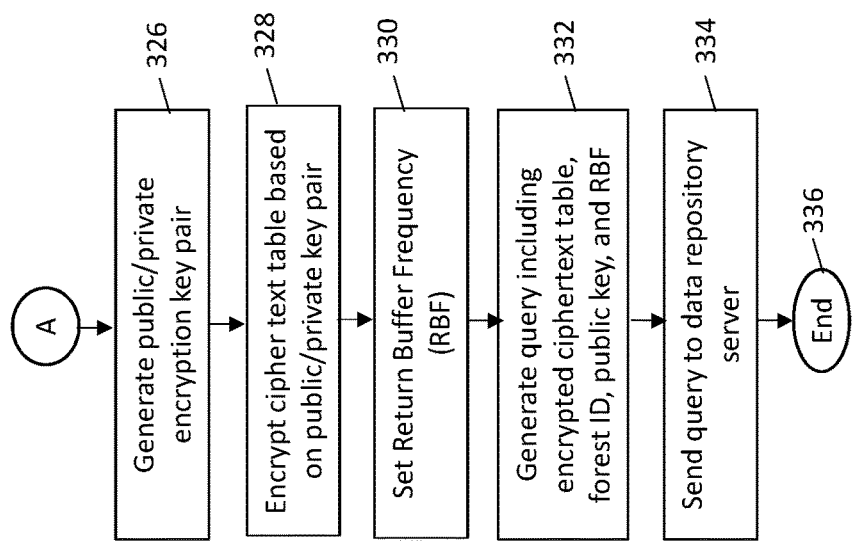

Turning now to FIGS. 2A and 2B, a flow diagram depicts a method of performing a query creation process by the data requesting client according to a non-limiting embodiment. The method begins at operation 300, and at operation 302 plain language search terms for performing a search on the data repository server 210 are generated. At operation 304, a weighted value can be assigned to the search terms. The weighted value can establish a distinguishable significance or property among the search terms included in a given query. As mentioned above, a TF-IDF analysis can be performed on each search term to establish its weighted value.

At operation 306 one or more TOPWORDS among the plain language search terms are determined. In one or more non-limiting embodiments, the terms are ranked according to their weighed values (e.g., TF-IDF values) and then sorted by rank in a descending order. A target number of the sorted ranked terms (e.g., 20 ranked terms) are then selected as the TOPWORDS.

At operation 308, the data requesting client 205 creates a query vector having a vector dimension (D) defined by a number (e.g., n=200) of fillable positions or vector slots. At operation 310, the data requesting client 205 applies a hash function to the terms (e.g., TOPWORDS) to generate an index pointing to one of the slots of the query vector to store each respective weighed value. As described above, each resulting hash represents an index value that points to a corresponding vector slot of the query vector. Accordingly, at operation 312 the data requesting client 205 fills each vector slot with a respective weighted value as indexed according to its corresponding hash to define the query vector.

Turning to operation 314, the data requesting client 205 selects a vector forest, which includes a plurality of randomized forest vectors that are shared with the data repository server 210. In one or more embodiments, the forest itself is assigned a unique identifier. At operation 316, the data requesting client 205 determines vector distances between the query vector and each forest vector, and then at operation 318 the data requesting client 205 identifies the nearest neighbor forest vectors based on the vector distances that are closest to the query vector.

At operation 320, the data requesting client 205 generates a query nearest neighbor ciphertext table. The query nearest neighbor ciphertext table includes a list of vectors identifier IDs that are cross-referenced to a respective ciphertext entry. At operation 322, the data requesting client 205 assigns a first value (e.g., an integer "1") to ciphertext entries corresponding to the closest nearest neighbor forest vectors, and at operation 324 assigns a second value (e.g., an integer "0") to the remaining ciphertext entries. At operation 326 (see FIG. 2B), the data requesting client 205 generates a private/public encryption key pair.

At operation 328, the data requesting client 205 encrypts the query nearest neighbor ciphertext table based on the private/public encryption key pair. As described above, entries from each slot in the ciphertext table are encrypted individually using the homomorphic ciphertext system, e.g., Paillier, such that a first value (e.g., an integer "1") is transformed into a ciphertext value $C_1$, that is indistinguishable from other such encryptions $C'_1$, and a second value (e.g., an integer "0") is similarly transformed into a ciphertext value $C_0$, similarly indistinguishable from other such encryptions $C'_0$. Each respective ciphertext is reassigned back into the slot from which it came, thus completing the encryption of the neighbor ciphertext table.

At operation 330, the data requesting client 205 sets an RBF value. As discussed above, the RBF value sets the frequency at which the data repository server 210 returns query results to the data requesting client 205. At operation 332, the data requesting client 205 generates an encrypted query 245 including, but not limited to, the encrypted ciphertext table, forest ID, public key, and the RBF value. At operation 334, the data requesting client 205 sends the encrypted query to the data repository server 210, and the method ends at operation 336.

Figure 3A:
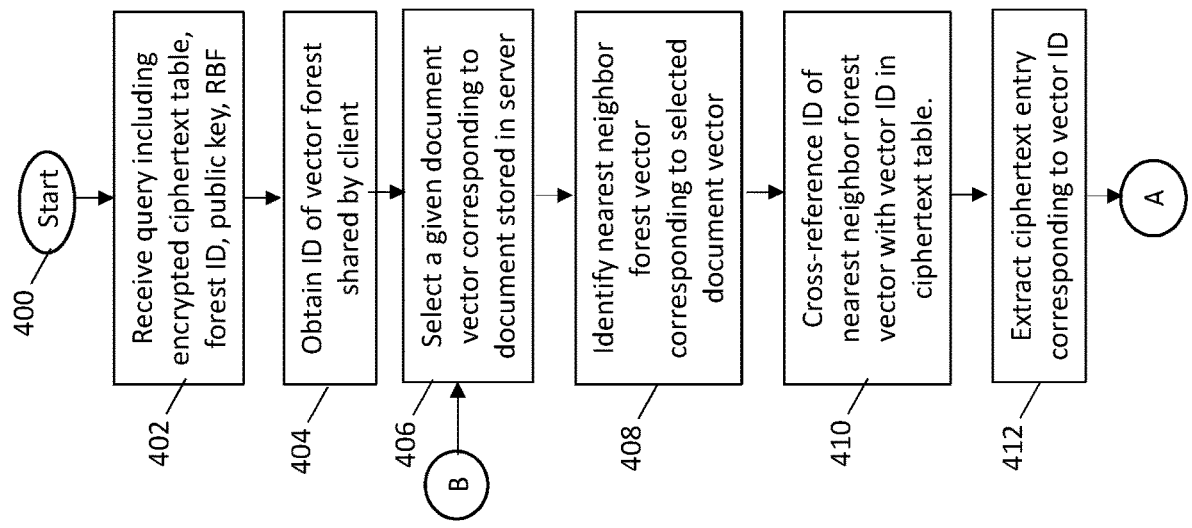
FIGS. 3A and 3B depict a flow diagram illustrating a TERP query search analysis performed by a data repository server according to a non-limiting embodiment.
Figure 3B:
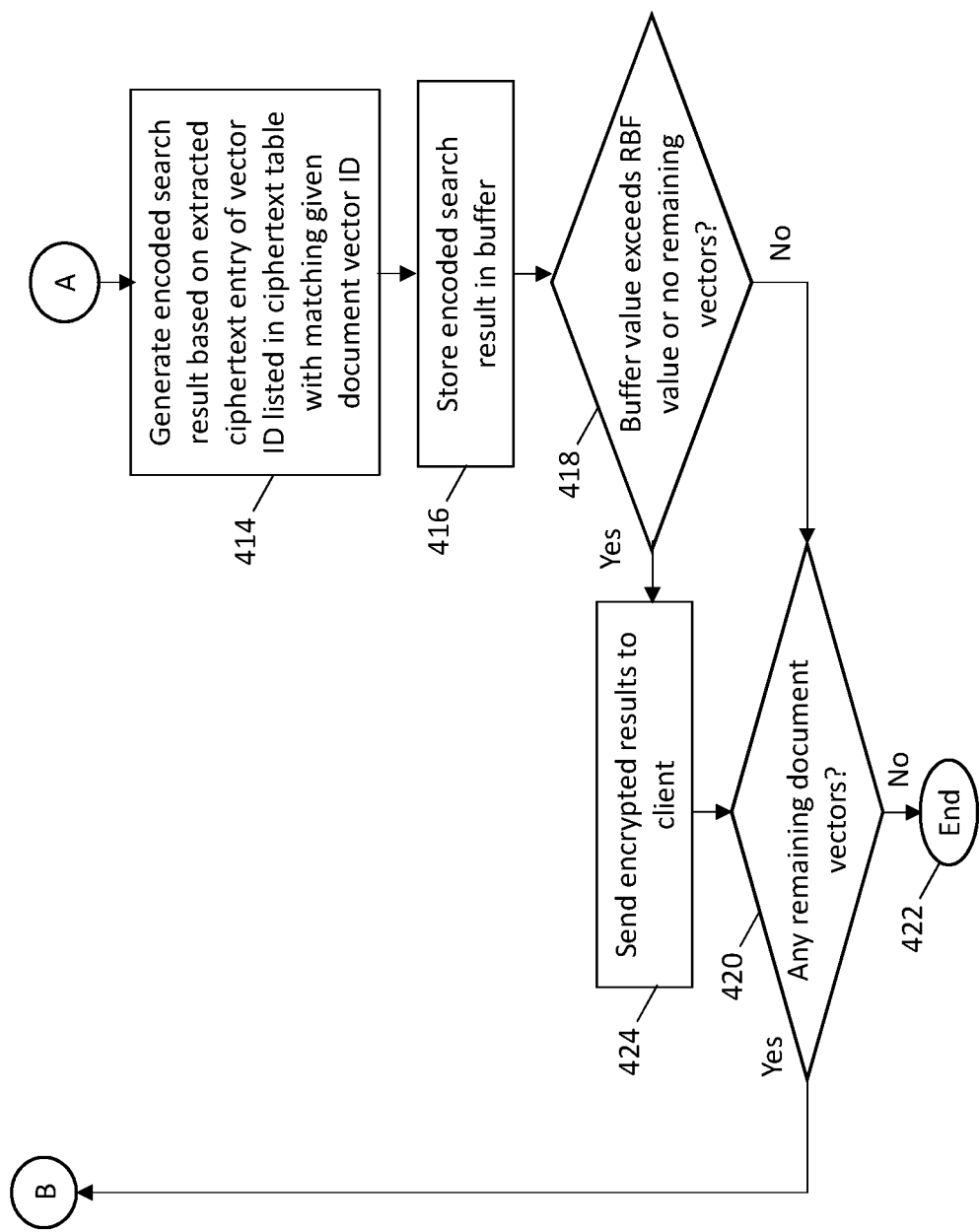

Referring to FIGS. 3A and 3B, a flow diagram depicts a method of performing a TERP query search analysis by a data repository server 210 according to a non-limiting embodiment. The method begins at operation 400, and at operation 402 the data repository server 210 receives an encrypted query 245 from the data requesting client 205. The encrypted query 245 can include, for example, an encrypted ciphertext table, a vector forest identifier, a public key, and an RBF value.

At operation 404, the data repository server 210 identifies the vector forest for performing the TERP query analysis and document search. In one or more embodiments, the data repository server 210 can identify the vector forest using the unique identifier of the forest provided by the client (e.g., see operation 314 in FIG. 2A). At operation 406, the data repository server 210 selects a document stored in the data repository server 210. As described in detail above, each document stored in the data repository server 210 can be represented by a document vector. At operation 408, the data repository server 210 determines the nearest neighbor vector of the selected document vector (i.e., the selected document). As described above, at least one nearest neighbor vector is assigned to each document stored in the data repository server 210.

At operation 410, the data repository server 210 cross-references the vector ID of the nearest neighbor vector corresponding to the given document with the vector IDs listed in the ciphertext table, and at operation 412 the data repository server 210 extracts the encrypted ciphertext entry ($C_X$) associated with the matching ID value. At operation 414 (see FIG. 3B), the data repository server 210 generates an encoded search result based, at least in part, on the ciphertext entries ($C_x$) associated with the vector IDs indexed in the ciphertext table, and stores the encoded search result in the buffer 276 at operation 416. In one or more non-limiting embodiments, the encoded search result includes a first encoded search result when the ciphertext entry ($C_X$) has a first value (e.g., an integer "1") and a second encoded search result (e.g., an integer "0") different from the first search result when the ciphertext entry ($C_X$) has a second value. The first encoded search result includes an encryption of metadata (M) associated with the given document, and the second encoded search result excludes an encryption of metadata (M) associated with the given document. The encryption of the metadata (M) with the ciphertext entry ($C_X$) can be performed, for example, using a homomorphic scalar multiplication technique. It should be appreciated, however, that other methods for encrypting the metadata (M) can be applied as described herein.

At operation 418, the data repository server 210 checks the current buffer value of the buffer 276 and compares the buffer value to the RBF value provided by the data requesting client 205. When the buffer value does not exceed the RBF value, the data repository server 210 proceeds to operation 420 and determines whether any stored documents remain to be analyzed. If not, the method ends at operation 422. Otherwise, if one or more documents stored in the data repository server 210 have not yet been analyzed, the method returns to operation 406 and selects another document to analyze according to operations 408-420 described above.

Returning to operation 418, when the buffer value exceeds the RBF value, the data repository server 210 sends the encrypted results stored in the buffer 276 to the data requesting client 205 at operation 424. The data repository server 210 then proceeds to operation 420 to determine whether any stored documents remain to be analyzed as described above. If not, the method ends at operation 422. Otherwise, if one or more documents stored in the data repository server 210 have not yet been analyzed, the method returns to operation 406 and selects another document to analyze according to operations 408-420 described above.

As described herein, various non-limiting embodiments described herein provide a term-based encrypted retrieval privacy (TERP) system, which permit a data requestor to transmit a query to a data repository, perform the query at the data repository, and receive query results while maintaining the privacy of not only the retrieved results but also the terms of the submitted query.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof. It will be further understood that the term "signal communication" includes any means, system or structure for exchanging data between two or more devices. For example, "signal communication" can include exchanging data between two or more devices wirelessly and/or can include a direct wired connection between two or more components to exchange data therebetween.

The figures illustrate the architecture, functionality, and operation of possible implementations of systems, methods, and computer program products according to various embodiments. In this regard, each block in the figures may represent one or more components, units, modules, segments, or portions of instructions, which comprise one or more executable instructions for implementing the specified logical function(s). The functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the figures, and combinations of blocks in the figures, can be implemented by special purpose hardware-based systems that perform the specified functions or acts or carry out combinations of special purpose hardware and computer instructions.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A term-based encrypted retrieval privacy (TERP) data retrieval system comprising:
    a data repository server configured to store a plurality of documents, the data repository server comprising:
        at least one server memory unit; and
        at least one server processor configured to execute instructions stored in the server memory unit to perform operations comprising:
            generating a document vector indicative of at least one term contained within the document;
            determining a vector forest including a plurality of forest vectors, each forest vector having assigned thereto a vector identifier (ID);
            determining vector distances between the document vector and the plurality of forest vectors, and identifying at least one nearest neighbor forest vector associated with the document vector based on the vector distances;
            receiving, from a data requesting client, a query including an encrypted ciphertext table that cross-references the vector IDs with a corresponding ciphertext entry ($C_X$);
            selecting a given document from the data repository server, the given document having assigned thereto at least one nearest neighbor vector included in the plurality of forest vectors, the at least one nearest neighbor vector having assigned thereto a nearest neighbor vector ID;
            comparing the nearest neighbor vector ID of the at least one nearest neighbor vector to the plurality of vector IDs included in the encrypted ciphertext table and generating an encoded search result based, at least in part, on the encrypted ciphertext entries ($C_X$); and
            outputting, by the server processor, the encoded search result to the data requesting client.

2. The TERP data retrieval system of claim 1, wherein generating the document vector comprises:
    determining a plurality of terms from the document, each of the document terms having assigned thereto a weighted numerical value;
    generating the document vector having a dimension defined by a plurality of fillable vector slots;
    generating index values based on the document terms, each index value pointing to a respective vector slot of the document vector; and
    filling each of the vector slots with the weighted numerical value of the corresponding document term indicated by the respective index value.

3. The TERP data retrieval system of claim 2, wherein determining the plurality of document terms comprises performing a term frequency-inverse document frequency (TF-IDF) analysis on a plurality of initial document terms to determine the weighted numerical values.

4. The TERP data retrieval system of claim 2, wherein determining the plurality of document terms further comprises:
    determining at least one TOPWORD from among the initial document terms;
    selecting the at least one TOPWORD to be included in the document terms.

5. The TERP data retrieval system of claim 4, wherein generating the index values include applying a hash function to each of the TOPWORD terms to generate resulting hashes, each of the resulting hashes representing one of the index values.

6. The TERP data retrieval system of claim 1, wherein determining the vector distances includes determining a cosine angle between the document vector and each forest vector included in the vector forest.

7. The TERP data retrieval system of claim 1, wherein the encoded search result includes a first encoded search result when the ciphertext entry ($C_X$) has a first value and a second encoded search result different from the first search result when the ciphertext entry ($C_X$) has a second value.

8. The TERP data retrieval system of claim 7, wherein the first encoded search result includes an encryption of metadata (M) associated with the given document, and wherein the second encoded search result excludes an encryption of metadata (M) associated with the given document.

9. The TERP data retrieval system of claim 8, wherein encrypting the metadata includes applying an integer function to combine the extracted metadata (M) with the extracted ciphertext entry ($C_X$).

10. The TERP data retrieval system of claim 9, wherein the data repository server further comprises a buffer, and wherein the query further includes a return buffer frequency (RBF) value.

11. The TERP data retrieval system of claim 10, wherein the data repository server performs a running count of candidate documents currently processed according to the query, and outputs the at least one encoded search result stored in the buffer to the data requesting client in response to a count value of the running count exceeding the RBF value.

12. The TERP data retrieval system of claim 1, wherein the vector forest is shared between the data repository server and the data requesting client.

13. A term-based encrypted retrieval privacy (TERP) data retrieval system comprising:
- at least one client memory unit; and
- at least one client processor configured to execute instructions stored in the client memory unit to perform operations comprising:
  - generating a query vector indicative of at least one search term of a query;
  - determining a vector forest that includes a plurality of forest vectors, each forest vector having assigned thereto a vector identifier (ID);
  - determining vector distances between the query vector and the plurality of forest vectors, and identifying at least one nearest neighbor forest vector associated with the query vector based on the vector distances;
  - generating an encrypted ciphertext table that includes the vector ID, the vector IDs cross-referenced with a respective ciphertext entry ($C_X$) having a first value indicating that a given forest vector is the at least one nearest neighbor forest vector or a second value indicating that the given forest vector is not the at least one nearest neighbor forest vector; and
  - sending the encrypted ciphertext table to a data repository server to perform a query search.

14. The TERP data retrieval system of claim 13, wherein generating the query vector comprises:
- determining a plurality of search terms, each of the search terms having assigned thereto a weighted numerical value;
- generating the query vector having a dimension defined by a plurality of fillable vector slots;
- generating index values based on the search terms, each index value pointing to a respective vector slot of the query vector;
- filling each of the vector slots with the weighted numerical value of the corresponding search term indicated by the respective index value.

15. The TERP data retrieval system of claim 14, wherein determining the plurality of search terms comprises performing a term frequency-inverse document frequency (TF-IDF) analysis on a plurality of initial search terms to determine the weighted numerical values.

16. The TERP data retrieval system of claim 15, wherein determining the plurality of search terms further comprises:
- determining at least one TOPWORD from among the initial search terms; and
- selecting the at least one TOPWORD to be included in the search terms.

17. The TERP data retrieval system of claim 16, wherein generating the index values includes applying a hash function to each of the TOPWORD terms to generate resulting hashes, each of the resulting hashes representing one of the index values.

18. The TERP data retrieval system of claim 13, wherein determining the vector distances includes determining a cosine angle between the query vector and each forest vector included in the vector forest.

19. A term-based encrypted retrieval privacy (TERP) system configured to perform data retrieval from a data repository server configured to store a plurality of documents, the TERP system comprising:
- a client processor included with a data requesting client, the client processor configured to determine a vector forest that is shared with the data repository server, the vector forest including a plurality of forest vectors, each forest vector having assigned thereto a vector identifier (ID),
  - wherein the client processor generates a query including an encrypted ciphertext table that cross-references the vector IDs with a corresponding ciphertext entry ($C_X$);
- a server processor included with the data repository server, the server processor configured to receive the query, and configured to select a given document from the data repository server, the given document having assigned thereto at least one nearest neighbor vector from among the plurality of forest vectors, the at least one nearest neighbor vector having assigned thereto a nearest neighbor vector ID,
  - wherein the server processor compares the nearest neighbor vector ID of the at least one nearest neighbor vector to the plurality of vector IDs included in the encrypted ciphertext table, generates an encoded search result based, at least in part, on the encrypted ciphertext entries ($C_X$), and outputs the encoded search result to the data requesting client, and
  - wherein the client processor decrypts the encoded search result to obtain results of the query.

20. The TERP system of claim 19, wherein the encoded search result includes a first encoded search result when the ciphertext entry ($C_X$) has a first value and a second encoded search result different from the first search result when the ciphertext entry ($C_X$) has a second value.

21. The TERP system of claim 20, wherein the first encoded search result includes an encryption of metadata (M) associated with the given document, and wherein the second encoded search result excludes an encryption of metadata (M) associated with the given document.

22. The TERP system of claim 21, wherein the encryption of metadata (M) is generated by applying an integer function to combine an integer representation of the metadata (M) with the ciphertext entry ($C_x$).

23. The TERP system of claim 21, wherein the client processor generates a query vector indicative of at least one search term of a query, determines vector distances between the query vector and the plurality of forest vectors, identifies at least one nearest neighbor forest vector associated with the query vector based on the vector distances, and generates the encrypted ciphertext table that includes the plurality of vector IDs and that includes a first ciphertext entry indicating that a given forest vector is the at least one nearest neighbor forest vector and a second ciphertext entry indicating that the given forest vector is not the at least one nearest neighbor forest vector.

24. The TERP system of claim 23, wherein the client processor determines the vector distances based on a cosine angle between the query vector and each forest vector included in the vector forest.

25. The TERP system of claim 23, wherein the first value indicates that the at least one nearest neighbor vector associated with the given the document is also the at least one nearest neighbor forest vector associated with the query vector, and wherein the second value indicates that the at least one nearest neighbor vector associated with the given the document is not the at least one nearest neighbor forest vector associated with the query vector.

* * * * *